J. HOPKINSON.
CLAMP FOR MEAT SLICING MACHINES.
APPLICATION FILED JUNE 8, 1920.
1,366,658.
Patented Jan. 25, 1921.
2 SHEETS—SHEET 1.
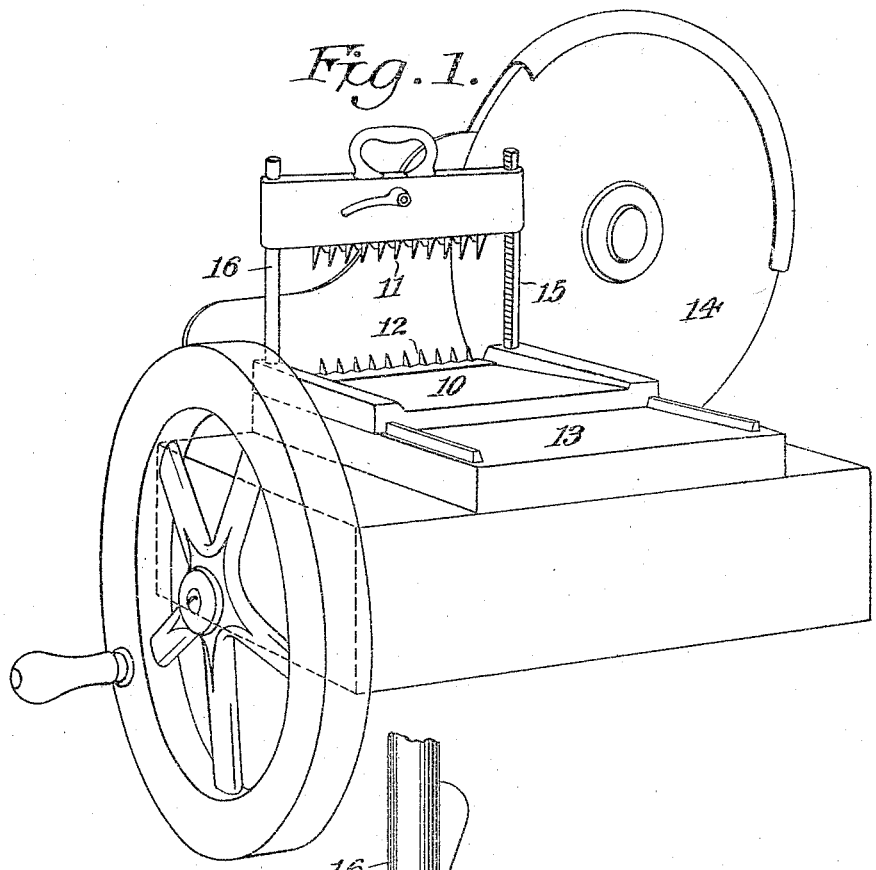
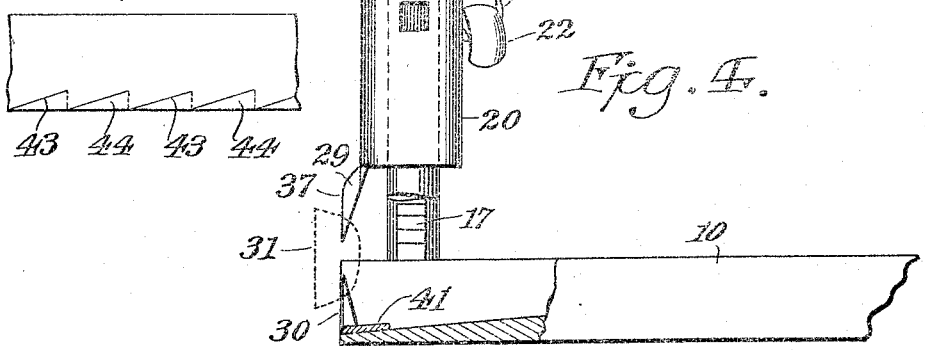
Inventor
Joseph Hopkinson
By his Attorneys
Kerr Page Cooper & Hayward J. HOPKINSON.
CLAMP FOR MEAT SLICING MACHINES.
APPLICATION FILED JUNE 8, 1920.
1,366,658.
Patented Jan. 25, 1921.
2 SHEETS—SHEET 2.
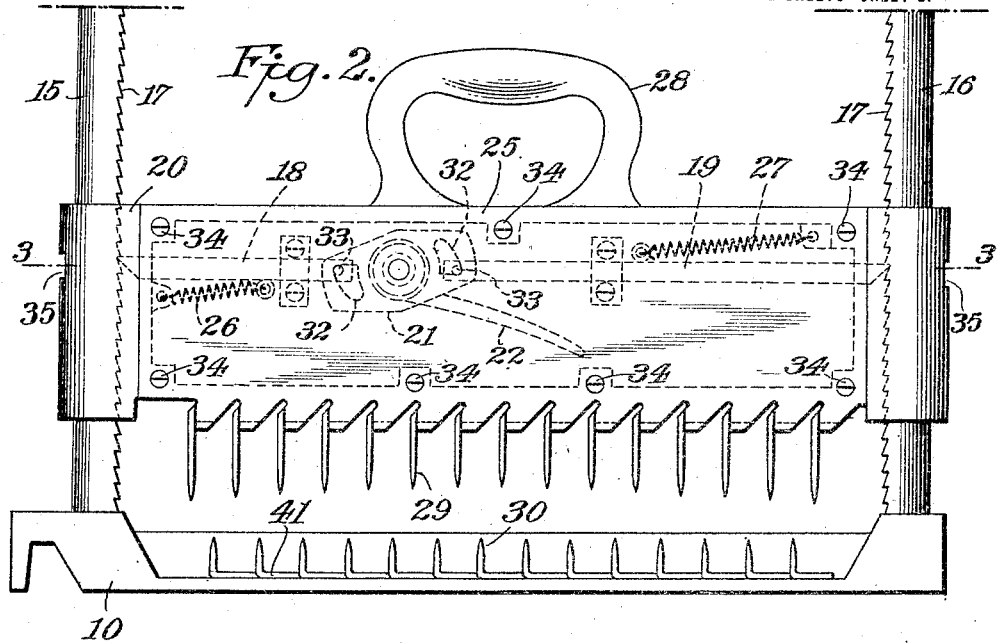
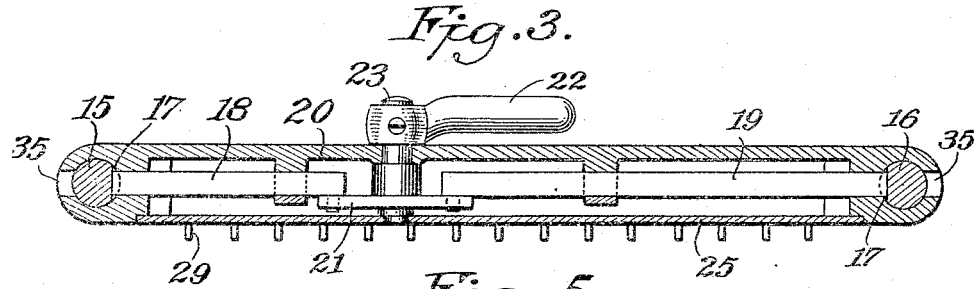
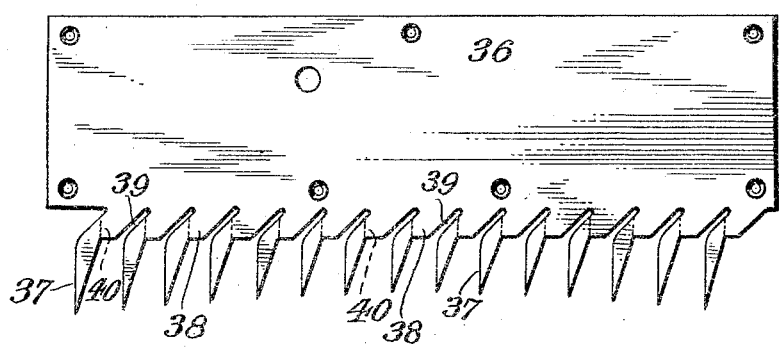
Inventor
Joseph Hopkinson
By his Attorneys
Kerr Page Cooper & Hayward

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

CLAMP FOR MEAT-SLICING MACHINES.

1,366,658. Specification of Letters Patent. Patented Jan. 25, 1921.

Application filed June 8, 1920. Serial No. 387,336.

*To all whom it may concern:*

Be it known that I, JOSEPH HOPKINSON, a citizen of the United States, residing at Dayton, Montgomery county, and State of Ohio, have invented certain new and useful Improvements in Clamps for Meat-Slicing Machines, of which the following is a full, clear, and exact description.

This invention relates to meat-slicing machines, and pertains more particularly to the clamp for holding the meat on the tray which is slidable on the reciprocating table by which the meat is carried into and out of engagement with the slicing knife. In machines of this type there is always left a "butt end" of the meat which is too short to be properly gripped and held by the ordinary clamp, and various clamps have been devised for the purpose of shortening this butt-end, that is to say, clamps which can grip the meat as closely to the end as possible, leaving only a short length in rear of the clamp. The prior devices, however, are rather complicated and relatively costly, nor are they wholly satisfactory. It is accordingly the object of my present invention to provide an improved clamp of simple and durable construction, capable of gripping the meat at the extreme end thereby reducing the butt-end practically to the minimum. To this and other ends the invention consists in the novel features of construction and combinations of elements hereinafter described.

One form of the invention is illustrated in the accompanying drawings, in which:

Figure 1 is a diagrammatic perspective view showing a meat-slicing machine of the general type for which the present form of my invention is designed.

Fig. 2 is a front view of the meat clamp, embodying my invention in its preferred form.

Fig. 3 is a sectional plan view about on line 3—3 of Fig. 2.

Fig. 4 is a side view of the clamp shown in Fig. 2.

Fig. 5 is a plan view of the sheet metal blank from which the upper gripper-plate is made.

Fig. 6 is a plan view of a portion of the sheet-metal blank from which the lower gripper-plate is made.

In the machine illustrated in Fig. 1 the piece of meat which is to be sliced is held on the tray 10 by means of the teeth 11—12. The bed 13, which carries the tray 10, is reciprocated as indicated by the arrows to carry the meat against and back from the disk-knife 14, and at each cut the tray is advanced by an amount equal to the thickness of one slice.

The two vertical standards 15, 16, are firmly fixed at the sides of the tray 10 near its forward edge, and on their inner faces are formed with downwardly disposed ratchet teeth 17 for engagement by the stops 18, 19, mounted inside the recessed clamping member 20 and movable horizontally therein by means of the cam 21 actuated by the hand lever 22 at the back of said member, the cam being rigidly mounted on a stud 23 journaled in the said member and in the toothed gripper plate 24. To fasten a piece of meat the lever 22 is depressed, thereby retracting the stops 18, 19 against the coil springs 26, 27, which normally urge the stops outwardly. The clamping member can now be raised by means of the handle 28. The meat is then placed under said member and the lever raised, thereby advancing the stops into engagement with the ratchet teeth on the standards. The clamping member is now depressed, causing the upper and lower clamping teeth 29, 30, to enter the meat and so hold the latter securely. Fig. 4 indicates in dotted lines at 31 a small piece of meat gripped in the manner described. The slots 32 in the cam 21, which engage the pins 33 in the stops 18, 19, to actuate the same, are large enough to permit said pins and stops to move inwardly when the cam is in the position shown in Fig. 2, thereby permitting the pointed outer ends of the stops to pass the teeth 17 as the clamping member is depressed. When the stops become too worn to be serviceable they can easily be replaced. For this purpose the clamping member is lifted off the standards and the toothed plate 25 is removed by taking out the screws 34. The pins 33 (which may be threaded in the stops) can then be removed, or the cam can be removed from the stud 23, after which the stops can be slipped out through the apertures 35.

The upper toothed plate 25 is preferably made from a blank 36, stamped of sheet-metal, preferably non-corrosive, of suitable gage. In the blank shown the tooth-edges 37, which are the front edges of the teeth 29, are preferably vertical, and the teeth are formed at the lower ends of the inclined arms 38 formed between the inclined slots 39. The teeth on the blank are bent upwardly or outwardly at right angles to the body of the blank on the lines 40, as shown in Fig. 2, so that the teeth 29 are placed well in advance of the front surface of the plate, with their vertical edges toward the front, as clearly indicated in Fig. 4. This position of the teeth permits the standards 15, 16, to be placed well in rear of the front edge of the tray 10, thereby affording ample clearance when the table is in its extreme forward position, and at the same time permits the very end of the meat to be held in position to encounter the knife.

The lower gripper plate, 41, Figs. 2 and 4, is preferably made from a blank such as shown at 42, Fig. 6. This blank is made by cutting inclined slits 43 in a strip of sheet-metal (preferably non-corrosive sheet steel of suitable gage). The parts 44, between the slits, are then bent upwardly at right angles to the strip, to form the teeth 30. The plate 41 is fastened to the tray, as by brazing or by means of screws, not shown, with the vertical front edges of its teeth in the plane of the vertical edges 37 of the upper teeth, but the teeth on the two plates are preferably staggered, as shown in Fig. 2, so that if necessary or desirable, as may happen with a thin piece of meat, the points of the teeth can pass each other. It is also desirable to have the upper teeth progressively longer from the innermost teeth outwardly, to permit a rounded piece of meat to be more securely gripped.

What I claim is:

1. A meat clamp adapted to clamp meat to the table of a meat-slicing machine, comprising in combination with the tray and the vertically adjustable clamping member, of clamping teeth carried by the tray having a substantially straight front edge substantially in alinement with the front of the tray and beveled rear edges, of a second set of coacting clamping teeth carried by the adjustable clamping member, said teeth having substantially straight vertical front edges and beveled rear edges.

2. A meat clamp adapted to retain meat upon the tray of a meat-slicing machine comprising in combination, a clamping member, a gripper plate secured thereto, said gripper plate having a plurality of gripper teeth thereon integral with the plate, and bent at right angles thereto, and means on the meat tray adapted to coöperate with the said teeth and to secure the meat in position.

3. A meat-gripping device adapted to be associated with the meat clamp of a slicing machine for securing meat thereto, comprising a plate-like member of sheet metal, a plurality of sheet metal teeth integral with said plate-like member and bent at substantially right angles thereto to space the tips of the teeth out of the plane of the plate, said teeth having beveled rear edges.

4. A meat-gripping device adapted for use on a meat-slicer comprising a plate-like member having a plurality of arms projecting therefrom at one edge thereof, said projecting arm portions being bent at an angle to the plane of the plate to form a series of individual meat-gripping teeth.

5. A meat-gripping device for a meat-slicer comprising a plurality of coacting meat-gripping elements, one of said elements comprising a plate having a plurality of teeth bent at an angle to the plane of the plate to space the tips of the teeth to one side of the plane of the plate, said second coacting gripping element comprising a plate having a plurality of teeth bent upward therefrom toward the teeth of the first-mentioned gripping element.

6. The invention set forth in claim 5 in which the teeth of one of the gripping elements are of various lengths to properly receive pieces of meat having a curved configuration.

7. The invention set forth in claim 5 in which the teeth of one gripping element are staggered relatively to the other element to interact therewith in gripping pieces of meat.

8. A meat clamp adapted to clamp meat in position to be sliced in a slicing machine, comprising in combination with the tray and the vertically adjustable clamping member of a sheet metal plate-like member secured to the clamping member, a plurality of integral inclined arms upon the lower edge of said plate, said inclined arms having portions thereof bent at substantially right angles to the plane of the plate to space the tips of the arms out of the plane of the plate, said projecting portions of said arms forming a series of individual meat-gripping teeth and coacting gripping teeth carried by the tray coöperating with the aforesaid teeth to secure a piece of meat in position to be sliced.

9. In a clamp for a meat slicer in combination with the upper clamping element and the lower supporting tray, of a sheet metal plate secured to the lower supporting tray portion, said plate having inclined slits at the forward edge thereof and teeth formed of the metal between adjacent slits and bent up substantially at right angles to the plane of the plate whereby the inclined slit edge forms the rearwardly beveled portion of each tooth and the front edge of the plate forms the straight front edge of each tooth, and coacting teeth carried by the upper clamping element.

10. In a clamp for a meat slicing machine in combination with an upper clamping member of a sheet metal plate secured to the forward edge of said clamping member, a plurality of angular slots in the lower edge of said plate, of a plurality of depending arms having a beveled edge and a vertical edge, said arms joining said plate intermediate the angular slots, said arms being bent at an angle to the plane of the plate to form meat gripping teeth having their tips to one side of the plane of the plate and having a substantially straight vertical edge and a beveled rear edge formed by the corresponding edges of the depending arms.

11. The invention set forth in claim 10 in which the tray portion is provided with co-acting gripping teeth, said teeth being bent up from a slotted edge of a sheet metal plate carried by the tray and having beveled rear edges and straight vertical forward edges.

In testimony whereof I hereto affix my signature.

JOSEPH HOPKINSON.